United States Patent [19]

Eustache

[11] Patent Number: 5,093,953
[45] Date of Patent: Mar. 10, 1992

[54] WINDSHIELD WIPER FOR NON-CIRCULAR WIPING

[75] Inventor: Jean-Pierre Eustache, Anthony, France

[73] Assignee: Valeo Systemes D'Essuyage, Montigny, France

[21] Appl. No.: 518,734

[22] Filed: Apr. 3, 1990

[30] Foreign Application Priority Data

Apr. 17, 1989 [FR] France .................. 89 05041

[51] Int. Cl.$^5$ .................. B60S 1/44; B60S 1/26
[52] U.S. Cl. .................. 15/250.21; 15/250.23; 74/25
[58] Field of Search .......... 15/250.13, 250.21, 250.23, 15/250.39, 250.29; 74/23, 24, 25

[56] References Cited

U.S. PATENT DOCUMENTS

| | | | |
|---|---|---|---|
| 4,447,928 | 5/1984 | Schüch et al. | 15/250.23 |
| 4,630,327 | 12/1986 | Schmidt | 15/250.21 |
| 4,648,148 | 3/1987 | Egner-Walter et al. | 15/250.23 |
| 4,847,941 | 7/1989 | Kuhbauch | 15/250.21 |

FOREIGN PATENT DOCUMENTS

| | | |
|---|---|---|
| 0217494 | 4/1987 | European Pat. Off. ......... 15/250.21 |
| 3427933 | 1/1986 | Fed. Rep. of Germany. |
| 2596345 | 10/1987 | France. |

Primary Examiner—Harvey C. Hornsby
Assistant Examiner—Gary K. Graham
Attorney, Agent, or Firm—Dennison, Meserole, Pollack & Scheiner

[57] ABSTRACT

A windshield wiper system which when operating will define a non-circular wiping pattern of a windshield wiper. The system includes a motor spindle and at least one windshield wiper arm interconnecting the motor spindle and the wiper arm for providing sliding movement in a radial direction. There includes a control component for controlling the sliding movements of the arm. The control component includes a drive spindle and arm mounted on the drive spindle which is adapted to be rotated. A coupling member interconnects a plurality of pivot members which are spaced eccentrically. An engaging member translates the wiper and wiper arm from an entirely semicircular path equidistant from the motor spindle to a non-circular path with respect to the motor spindle in at least two portions of the wiping pattern.

9 Claims, 2 Drawing Sheets

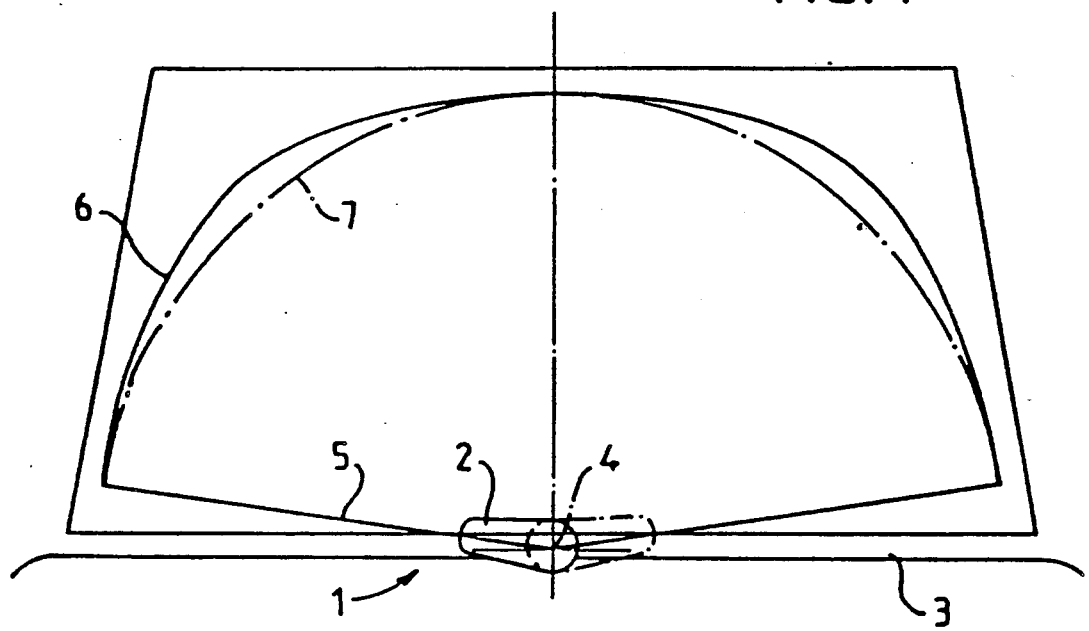
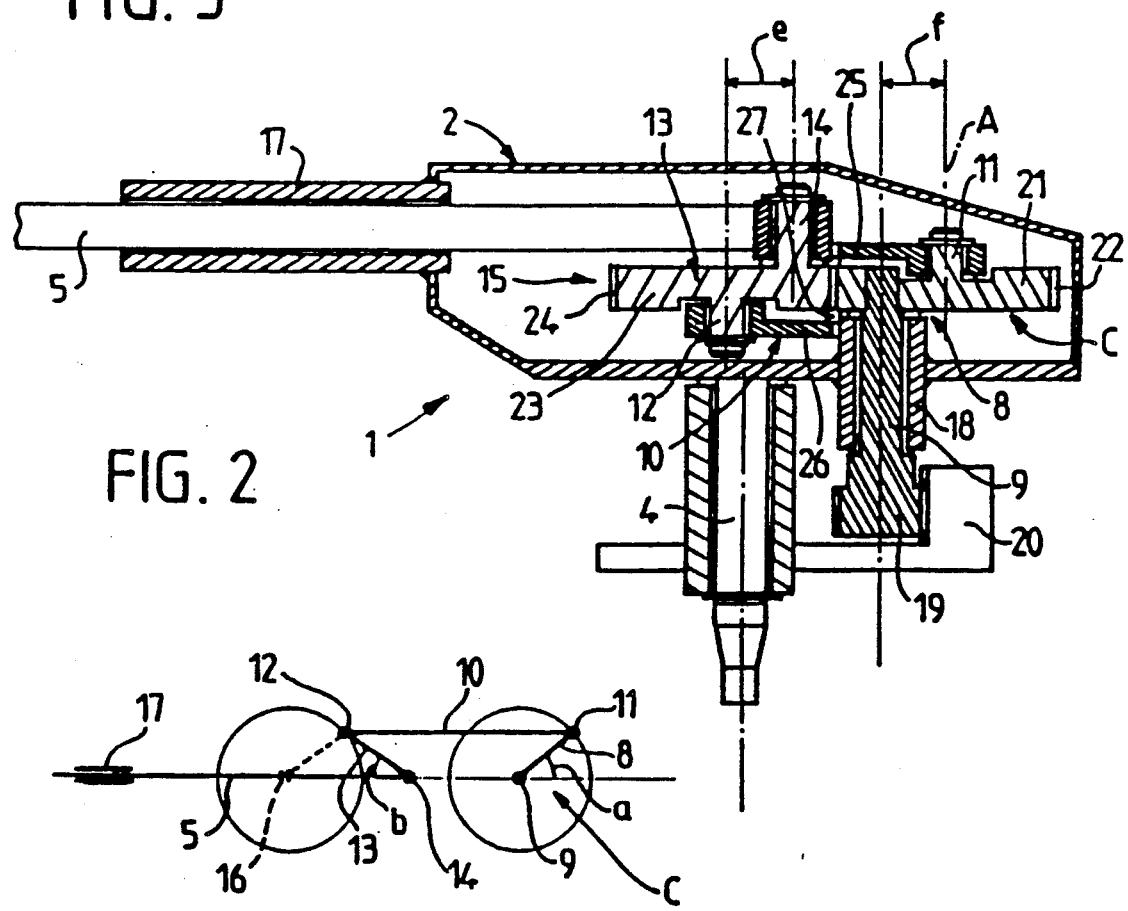

WINDSHIELD WIPER FOR NON-CIRCULAR WIPING

FIELD OF THE INVENTION

This invention relates to a windshield wiper for giving a non-circular wiping pattern, being of the kind which comprises: a casing adapted to be driven relative to a fixed structure in oscillating rotational movement by means of a motor spindle; at least one windshield wiper arm which is mounted in the casing for sliding movement therein in the radial direction; and control means for the sliding movements of the arm.

DISCUSSION OF THE INVENTION

Numerous solutions have hitherto been proposed for windshield wipers of kinds such as that defined above. However, the control means for the sliding movement of the arm are relative bulky and complicated.

A principal object of the invention is to provide a windshield wiper for giving a non-circular wiping pattern and being of the kind defined above, in which the control means for the sliding movements of the arm are simple, robust and compact, while at the same time enabling the radial sliding movement of the arm to be of sufficient amplitude.

In accordance with the invention, a windshield wiper for giving a non-circular wiping pattern, and being of the kind defined above, is characterised by the fact that the control means for the sliding movements comprise: crank means mounted on a drive spindle which is carried by the casing, the drive spindle being adapted to be rotated with respect to the casing during the movement of the latter; and a coupling member which is pivoted, through a pivot at one of its ends, on the crank means, this pivot being spaced away from the drive spindle, and the coupling member being connected at its other end to a first pivot of a rigid element, the rigid element also having a second pivot for coupling it with one end of the windshield wiper arm, orienting means being further provided so as to confer on the straight line joining the first and second pivots of the rigid element a direction which is dependent on that of the crank means, during the rotation of the latter, in such a way that the second pivot drives the windshield wiper arm in radial translational movement with respect to the casing.

Preferably, the second pivot of the rigid element is spaced away from the first pivot by a distance equal to the effective length of the crank means, and the orienting means are so arranged as to locate the straight line joining the first and second pivots of the rigid element so as to follow a direction which is anti-parallel to the direction of the crank means with respect to the direction of the arm, so that during the rotation of the crank means, the coupling member remains parallel to itself and, to the arm, the said second pivot describing, with respect to the casing, a rectilinear path aligned on the axis of the arm.

Preferably, the drive spindle for the crank means extends through the casing and carries, at that one of its ends which lies outside the casing, a pinion adapted to mesh with a toothed crown which is fixed with respect to the fixed structure, the toothed crown being coaxial with the motor spindle.

Preferably, the crank means comprise a first disc which is fixed eccentrically on the drive spindle, the first disc carrying at its center, on the side opposite to the drive shaft, the pivot to which the coupling member is articulated.

In addition, the rigid element preferably comprises a second disc lying below the arm and carrying at its center, on the side opposite to the arm, the first pivot connected with the coupling member, with the second pivot, on which the end of the arm is articulated, being carried eccentrically on the opposite side of the second disc. Preferably, the eccentricity of the second pivot is equal to the eccentricity of the drive spindle relative to the pivot of the first disc, constituting the crank means, which is mounted on the spindle.

Preferably, the two discs are of equal diameter, and the orienting means are adapted to cause the two discs to rotate about their axes through the same angular displacement but in opposite directions.

Preferably, the two discs comprise toothed gear wheels which mesh with each other, with their respective sets of teeth constituting the orienting means.

In a variant, the peripheral edges of the two discs may be smooth, being in particular provided with a friction coating, in such a way as to roll without sliding against each other.

Apart from the arrangements discussed above, the invention embraces other arrangements, which will be more apparent from the description of a particular preferred embodiment of the invention, given below by way of example only and in no way limiting, with reference to the accompanying drawings.

BRIEF DESCRIPTION OF THE DRAWINGS

FIG. 1 is a diagram showing a non-circular windshield wiping pattern.

FIG. 2 is a diagram illustrating the geometry of a windshield wiper for non-circular wiping in accordance with the invention.

FIG. 3 is a cross section taken on the line III—III in FIG. 4, showing one windshield wiper in accordance with the invention.

Finally.

DESCRIPTION OF A PREFERRED EMBODIMENT OF THE INVENTION

Figure 4:
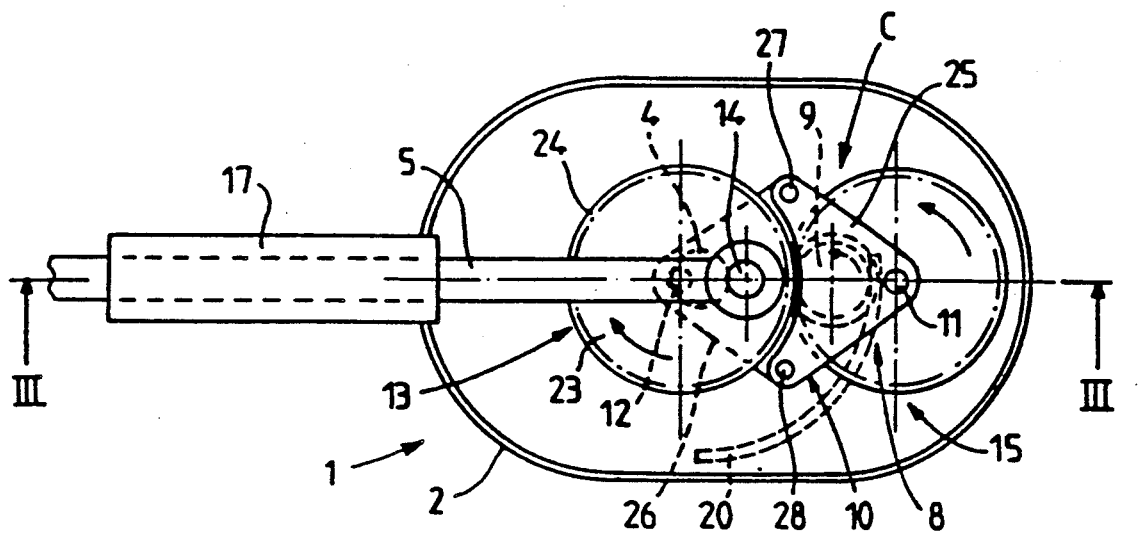
FIG. 4 is a top plan view with respect to FIG. 3, showing the windshield wiper arm reduced to its minimum working length.

Referring first to FIG. 1, this is a diagram of the wiping pattern for a windshield of an automotive vehicle, in which a windshield wiper 1 sweeps the glass in a non-circular wiping pattern. The windshield wiper includes a casing 2 which is arranged to be driven, relative to a fixed body 3 which in this case is the body of the vehicle, by a motor spindle 4 in oscillating rotational movement. The windshield wiper shown is of the single wiper type, and comprises a single arm 5, with the motor spindle 4 being situated at the center of the bottom edge of the windshield. The means for driving the spindle 4 are of a conventional kind and are not shown; they generally include an electric motor combined with a crank and connecting rod system.

The windshield wiper arm 5 is mounted in the casing 2 so as to be able to slide in the latter in the radial direction. Control means C (FIG. 3) for the sliding movements of the arm are provided for the purpose of increasing the effective or working length of the arm towards the upper corners of the windshield.

The outer boundary 6 of the swept zone, which is shown in full lines in FIG. 1, is situated beyond the boundary 7, shown in phantom lines, of a circular swept zone which would be obtained with an arm having a constant length equal to the effective length of the arm 5 in its lowest position.

The control means C for the sliding movements, as indicated diagrammatically in FIG. 2, comprise crank means 8 which are mounted on a drive spindle 9 carried by the casing 2 and substantially parallel to the motor spindle 4. The drive spindle 9 is arranged to be rotated with respect to the casing 2 during movement of the latter.

A coupling member 10 is pivoted at one of its ends to the crank means 8 of a pivot 11, formed on the crank means 8 and spaced away from the drive spindle 9. This coupling member 10 is connected at its other end through a first pivot, 12, of two points provided on a rigid element 13, the second pivot 14 of which is spaced from the first pivot 12, the second pivot 14 providing a coupling with one end of the sliding arm 5. Orienting means 15 (see FIGS. 3 and 4) are provided in order to locate the straight line joining the pivots 12 and 14, with respect to the arm 5, in a direction which depends on that of the crank means 8. During the rotation of the crank means 8, the arm 5 is displaced in radial sliding movement.

Preferably, the effective length of the rigid element 13, that is to say its length between the pivots 12 and 14, is equal to the effective length of the crank means 8, that is to say the distance between the spindle 9 and the pivot point 11. The coupling member 10 comprises a link which will be described later herein. The orienting means 15 are arranged to locate the line 12-14 to follow a direction which is anti-parallel to the direction of the crank means 8, with respect to that of the arm 5. In other words, the angles a and b, defined between the extension of the arm 5 and the straight lines 12-14 and 9-11, are equal but face in opposite directions.

The coupling member 10, when moving, remains parallel to itself, i.e. parallel to a fixed direction which is also the mean direction of the arm 5. Under these conditions, the path of the pivot 12 during rotation of the crank 8 is a circle centered on a point 16 which is fixed with respect to the casing 2 and which lies on the mean path of the arm 5 at a distance from the spindle 9 equal to the effective length of the coupling member 10.

The pivot 14 describes a natural rectilinear path which is aligned on the axis of the arm 5, and the latter is able to be guided in sliding movement by a sleeve 17 which is fixed to the casing 2.

Following the kinematic diagram of FIG. 2, it will be understood that other orienting means than means 15, which have just been described, may be provided. In particular, a deformable parallelogram could be employed by connecting the pivot 12, by means of a rigid link, to a fixed point 16 on the casing, with the corners of the parallelogram being defined by the points 9, 11, 12 and 16. Rotation of the crank 8 causes this parallelogram to be deformed, and also causes the rigid element 13 to move, with the end 14 of the latter being displaced along a straight line to drive the arm 5.

In the embodiment shown in the drawings, as shown especially in FIG. 3, the drive spindle 9 extends through the lower wall of the casing and is guided in a bearing 18 carried by the casing. The spindle 9 carries, at one of its ends which is located outside the casing 2, a pinion 19 which meshes with a toothed crown sector 20 which is fixed with respect to the hood 3 and centered on the axis of the motor spindle 4.

The crank means 8 comprises a first disc 21 having a set of teeth 22 on its periphery to form a gear wheel. The disc 21 is fixed on the end of the spindle 9 that is located inside the casing 2, at a point on the disc which is offset from its axis A. The pivot 11 is located on the side of the disc 21 opposite to the drive spindle 9.

The rigid element 13 consists of a second disc 23, of the same diameter as the disc 21 and having on its periphery a set of teeth 24, again to constitute a gear wheel and cooperating with the teeth 22 of the disc 21. The disc 23 is situated below the arm 5 as shown in FIG. 3, that is to say between the arm 5 and the spindle 4. At its center on the side opposite to the arm 5, the disc 23 carries a pivot, constituting its first pivot 12, which is connected to the coupling member 10. On its opposite side, the disc 23 carries eccentrically its second pivot 14, for the end of the arm 5. The eccentricity e of the pivot 14, relative to the pivot 12, is equal to the eccentricity f of the spindle 9 in relation to the pivot 11 carried by the disc 21.

The discs 21 and 23 lie in a common mean plane. The coupling member 10 comprises two plates 25 and 26, lying in different planes respectively above and below the discs 22 and 23. Each of these plates is substantially in the form of an isosceles triangle, the base of which is curved and concave towards the apex of the triangle. The plates 25 and 26 are oriented in opposite directions, about an axis of symmetry defined by an extension of the mean direction of the arm 5. One corner of the plate 25 is articulated on the pivot 11, while one corner of the plate 26 is articulated by the pivot 12. The ends of the curved bases of the plates 25 and 26 are connected rigidly to each other by means of spacing pins 27 and 28, which are substantially parallel to the motor spindle 4 and orthogonal to the mean plane of the plates 25 and 26.

Figure 5:
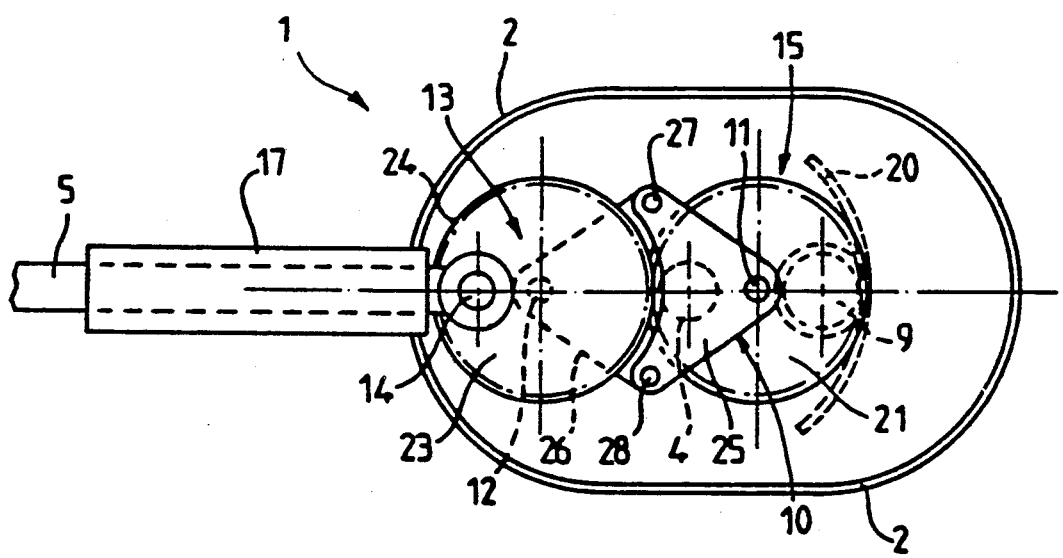
FIG. 5 shows, in a similar manner to FIG. 4, the same windshield wiper extended to its maximum working length.

As can be seen from FIG. 5, the disc or gear wheel 23 follows the curved concave base of the plate 25, from which it is spaced with a given clearance, while the disc or gear wheel 21 similarly follows the curved base of the plate 26, again with a given clearance between them.

The operation of the windshield wiper in accordance with the invention will at once be evident from the foregoing description. When the windshield wiper is started, the spindle 4 is driven in oscillating rotational movement by the above mentioned wiper motor, which may be combined if desired with a suitable system for amplifying the angle, coupled with the motor spindle 4. The casing 2, being fixed on the upper end of the spindle 4, is thus also set in oscillating rotating movement. The drive spindle 9 and the pinion 19 are driven in this same movement. Due to the meshing of the pinion 19 on the fixed toothed sector 20, the former is set in rotation, together with the drive spindle 9, about the geometric axis of the drive spindle 9, relative to the casing 2.

The disc 21 is driven by the drive spindle 9 in rotational movement relative to the casing 2. Because of the eccentricity of the drive spindle 9 relative to the pivot 11 coaxial with the disc 21, the pivot 11 then proceeds to describe, relative to the casing 2, a circumferential path centered on the geometric axis of the drive spindle 9 (see FIG. 2). The gear wheel or disc 23, being of the same diameter as the gear wheel 21 against which it rolls without sliding, rotates about its axis in the opposite direction but through the same angle as the gear wheel 21 rotates about its own axis. In addition, the coupling member 10 transmits to the gear wheel 23 the circular translational movement of the disc 21 with respect to the casing 2.

Thus, as can be seen in FIG. 2, the pivot 12, being situated at the center of the gear wheel 23, describes relative to the casing 2 a circumferential path, of the same diameter as that described by the pivot 11 but centered on the point 16, FIG. 2, which is fixed with respect to the casing 2. The pivot 14 is displaced along a rectilinear path which is collinear with the axis of the arm 5, and drives the latter in an alternating translational movement with respect to the casing 2.

The sliding movements of the arm 5 in the sleeve 17 are effected freely and with minimum friction, because the natural path of the pivot 14 is aligned with the axis of the sleeve 7. The angular relationships between the different elements are designed in such a way that the maximum effective length (that is to say the maximum value of the length situated outside the casing 2) of the arm 5 is obtained in the angular positions of the arm which are directed towards the upper corners of the windshield (see FIG. 1). The minimum value of the effective length of the arm is obtained at the two ends of its angular path and in the mean position corresponding to the line bisecting the swept sector. The minimum effective length of the arm 5 corresponds to the position in which it is retracted to the maximum extent into the casing 2, this being illustrated in FIG. 4. This position is obtained when the pivots 11 and 12 lie on the extension of the mean direction of the arm 5, with the pivot 11 being on the opposite side of the spindle 9 from the arm 5. The maximum effective length of the arm 5 is obtained in the position shown in FIG. 5, in which the pivots 11 and 12 are again aligned with each other along the mean direction of the arm 5, but the pivot 11 is on the same side of the shaft 9 as is the arm 5.

Although the windshield wiper installation described above is of the single wiper type, it will be clear that the invention may be applied to a windshield wiper having two wipers and two or more arms.

The control of the rotation of the drive spindle 9 by a fixed toothed sector 20 allows the mass that needs to be displaced to be reduced. The whole is compact and is mounted entirely within the casing 2 which is itself of reduced size and which is oscillated in rotating movement in a conventional manner.

What is claimed is:

1. A windshield wiper system which when operating will define a non-circular wiping pattern of a windshield arm and blade assembly, said system comprising:
   a motor spindle;
   means for mounting the motor spindle on a fixed structure for oscillating rotating movement;
   a casing fixed to the motor spindle;
   at least one elongated windshield wiper arm mounted in said casing for radial reciprocating movement therein with respect to said casing;
   and means for imparting reciprocating movement to said wiper arm, wherein the means include:
   a drive spindle;
   means for mounting the drive spindle rotatably in the casing;
   crank means mounted on the drive spindle;
   gear means for rotating said drive spindle with respect to the casing in response to the movement of the casing;
   a rigid element in the casing defining a first pivot and a second pivot therein;
   a third pivot mounted on said crank means and laterally spaced from said drive spindle;
   a rigid coupling member extending between said first and third pivots and pivotally mounted on said first and third pivots;
   said wiper arm being pivotally mounted on said second pivot;
   said rigid element and said crank means having engaging means thereon for imparting movement of said crank means to said rigid element upon rotation of said motor spindle such that said second pivot reciprocates said wiper arm for movement from a first semi-circular path equidistant from said motor spindle in a portion of said wiping pattern to a second semi-circular path different from said first semi-circular path with respect to said motor spindle in at least a portion of said total wiping pattern.

2. A windshield wiper system according to claim 1, wherein the drive spindle extends through the casing, the means for rotating the drive spindle in the casing comprising a toothed crown fixed to the said fixed structure coaxially with the motor spindle, and a pinion meshing with said crown and carried by the drive spindle at that one of its ends which lies outside the casing.

3. A windshield wiper system according to claim 1, wherein the crank means comprise a first disc which is fixed eccentrically on the drive spindle, said first disc carrying said third pivot at its center, on the side opposite to the drive shaft.

4. A windshield wiper system according to claim 3, wherein said rigid element comprises a second disc lying below the arm and carrying said first pivot at its center, on the side opposite to the arm, with said second pivot being carried eccentrically on the opposite side of said second disc.

5. A windshield wiper system according to claim 4, wherein the eccentricity of the second pivot is equal to the eccentricity of the drive spindle relative to the said third pivot.

6. A windshield wiper system according to claim 5, wherein said first and second discs are equal in diameter, the engaging means being adapted to cause both said discs to rotate about their axes through the same angular displacement but in opposite directions.

7. A windshield wiper system according to claim 6, wherein said first and second discs comprise toothed gear wheels meshing with each other, said engaging means comprising the sets of teeth of the respective discs.

8. A windshield wiper system according to claim 6, wherein peripheral edges of the said first and second discs are smooth, and provided with a friction coating.

9. A windshield wiper system according to claim 1, wherein said second pivot of said rigid element is spaced from said first pivot by a distance equal to the effective length of said crank means, said engaging means positioned in said system to orient a first angle defined between the longitudinal axis of the wiper arm and a line between the first and second pivots and said engaging means orienting a second angle defined between the longitudinal axis of the wiper arm and a line between the third pivot and the drive spindle axis wherein during rotations of said crank means said first and second angles remain equal and a line between the first and third pivots remains parallel to the longitudinal axis of the wiper arm, and said second pivot defining a rectilinear path aligned on the longitudinal axis of said wiper arm.

* * * * *